US008349938B2

(12) United States Patent
Milesi et al.

(10) Patent No.: US 8,349,938 B2
(45) Date of Patent: Jan. 8, 2013

(54) PROCESS FOR MAKING POLYOLEFIN COMPOSITIONS

(75) Inventors: Daniel Milesi, Voiron (FR); Alexis Von Tschammer, Isère (FR); Patrick Prele, Savoie (FR)

(73) Assignee: Multibase SA, Saint Laurent du Pont (FR)

( * ) Notice: Subject to any disclaimer, the term of this patent is extended or adjusted under 35 U.S.C. 154(b) by 487 days.

(21) Appl. No.: 12/598,610

(22) PCT Filed: May 2, 2008

(86) PCT No.: PCT/EP2008/055416

§ 371 (c)(1),
(2), (4) Date: Apr. 2, 2010

(87) PCT Pub. No.: WO2008/135529

PCT Pub. Date: Nov. 13, 2008

(65) Prior Publication Data

US 2010/0234513 A1 Sep. 16, 2010

(30) Foreign Application Priority Data

May 3, 2007 (FR) ..................................... 07 03193

(51) Int. Cl.
*C08K 3/34* (2006.01)
*C09K 3/10* (2006.01)

(52) U.S. Cl. ......... 524/444; 524/447; 524/449; 525/192

(58) Field of Classification Search .................. 524/447, 524/449; 525/192

See application file for complete search history.

(56) References Cited

U.S. PATENT DOCUMENTS 6,348,536 B1 2/2002 Fourty et al.

FOREIGN PATENT DOCUMENTS

| | | | |
|---|---|---|---|
| EP | 0897948 | A1 | 2/1999 |
| FR | 2761692 | A1 | 10/1998 |
| GB | 2295617 | A | 6/1996 |
| WO | WO 2004012917 | A2 | 2/2004 |

OTHER PUBLICATIONS

English language abstract for FR 2761692 extracted from PAJ database Jan. 18, 2010, 26 pages.
English language abstract for WO 2004012917 extracted from espacenet.com database, dated Jan. 18, 2010, 54 pages.
PCT International Search Report for PCT/EP2008/055416, dated Oct. 29, 2009, 4 pages.

*Primary Examiner* — Terressa Boykin
(74) *Attorney, Agent, or Firm* — Howard & Howard Attorneys PLLC

(57) ABSTRACT

A process of obtaining a thermoplastic composition formed from a polyolefin matrix is disclosed. The polyoelfin matrix comprises a polypropylene The process comprises (a) the formation of a viscoelastic mixture of the polypropylene and the lamellar mineral by heating and kneading the composition at a temperature at least equal to the working temperature of the polypropylene, (b) submitting the viscoelastic mixture to thermo-mechanical work, (c) eliminating volatile components from the viscoelastic mixture, and (d) transforming the viscoelastic mixture resulting from step (c) into a granulated material. The viscoelastic mixture is subjected during steps (a) and (b) to a weak and controlled rate of shearing of no more than 200 $s^{-1}$ and the viscoelastic mixture is subjected in step (b) to at least one cycle of extension and relaxation in a dedicated zone which is at least 25% of the total length of at least one screw of a compounding extruder.

16 Claims, No Drawings

PROCESS FOR MAKING POLYOLEFIN COMPOSITIONS

RELATED APPLICATIONS

This application claims priority to and all the advantages of International Patent Application No. PCT/EP2008/055416, filed on May 2, 2008, which claims priority to French Patent Application No. FR07/03193, filed on May 3, 2007.

The invention relates to a process for making a thermoplastic composition through a compounding extruder, wherein the composition comprises a polyolefin matrix and a lamellar mineral filler. The filler may be present at a ratio of from 0.5 to 70% by weight of the combined filler and matrix weight, with the higher ratios useful as masterbatches, the lower ratios as ready-to-use compositions and the intermediate ratios as either.

The invention more particularly relates to a process of obtaining thermoplastic compositions with a polypropylene matrix, which may be a homo or copolymer or a mixture of both and with a talc lamellar mineral filler.

The invention also relates to the use of such thermoplastic composition in the form of a master batch, which is then diluted into an end-use thermoplastic composition, preferably based for the larger part by weight on a polypropylene polymer, whether homopolymer, copolymer or a mixture thereof, for the modification or reinforcement of such end-use thermoplastic compositions. Alternatively the thermoplastic compositions can be provided as an end-use thermoplastic composition, i.e. no longer requiring dilution. The end-use thermoplastic compositions are destined to be transformed through one or more \# “0000”*MERGEFORMAT ¶0048⊥] The components were mixed in a compounding compromise between rigidity and impact resistance, thus requiring a good impact resistance and a good rigidity. The invention is looking to achieve this with a modest level of filler which may be used in order to limit or reduce the density of the end-use thermoplastic compositions compared to the existing art, whilst maintaining a high level of rigidity and of impact resistance. There is also a need in some cases to provide an end-use thermoplastic composition which has a higher loading of filler, for example similar to those which can be used as master batches, where the main benefit would be directed, not to the reduction in density, but to the provision of similar or substantially equivalent properties to those provided when alternative fillers, such as glass fibre, have been used. Glass fibre has a number of disadvantages associated with it, not least relating to the wear on tools used in their incorporation during the manufacture of thermoplastic compositions.

Master batches, i.e. concentrated materials or materials able to provide specific properties such as reinforcement, in the form of thermoplastic matrices comprising fillers or modification agents and end-use thermoplastic compositions are known in the art. Designers of technical parts, such as those used in the automotive industry, domestic appliance industry, electronic industry, building industry, construction industry, internal design industry, sport and leisure industry, in packaging or in toys, will often choose those materials which exhibit good rigidity, i.e. having a high modulus of elasticity at flexure, which would then allow him to reduce the thickness of the technical parts. However, at the same time they would not wish to lose impact resistance, whether at low (even below freezing) or ambient temperature, however the impact resistance is measured, whether notched or unnotched.

In general there is an inverse correlation between rigidity and impact resistance, which is why much development continues in the field of propylene, and in particular their copolymers in search of good impact resistance without too much loss of their rigidity. This has resulted in a range of polypropylene compositions which incorporate a number of impact resistance modifying agents, in particular thermoplastic elastomers, such as EPDM, and crystallinity modifying agents. Other developments have been made, in particular those relating to the addition of mineral fillers, such as calcium carbonate, talc and glass fibre, resulting in polypropylenes with glass fibre fillers to result in the most rigid, followed by the polypropylene compositions with talc fillers.

It has been found that the increase of the rigidity by the addition of mineral fillers, whether particulate or fibrous, is proportional to the quantity of the fillers added in the polypropylene matrix, taking into account the quality of their dispersion. However the mechanical characteristics of the thermoplastic matrix also play a role, for example the choice of homopolymer vs. copolymer, the morphology of the polymer chain which constitutes the matrix polymer. There is also an influence of the morphology of the filler and the interaction between filler and matrix.

French patent 2761692 for example provides a process for manufacturing a part made of thermoplastic material based on polypropylene, filled with a mineral powder, which comprises using a talc powder treated in accordance with a process forming the main invention of that patent, and having a lamellarity index greater than 5. The Exemplified talc powders have a lamellarity index of 9 or 10. The patent further describes mixing said talc powder with the thermoplastic material in a molten state so as to obtain a mixture whose proportion of talc by weight lies between 5% and 35% based on the thermoplastic material, and carrying out a forming operation starting with the mixture so as to obtain a part with the desired shape and so as to orientate the talc particles along preferred directions. This process of using the specifically treated talc is stated to be beneficial with a view to increasing the modulus of elasticity at flexure of these materials for a given impact resistance.

Thus a part which is made from a thermoplastic material based on a copolymer of ethylene and polypropylene, having a proportion of talc made according to the process described in U.S. Pat. No. 6,348,536 of 25% by weight, possess a modulus of elasticity at flexure of 2600 MPa and a resistance against impact of 40 kJ/m2, when measured according to the Charpy impact test method on unnotched samples at −20° C., as described in ISO178 and ISO179 standards.

There is a need to provide plastic parts which are lighter, especially in view of environmental needs. For example automotive plastic parts are preferably those with a density below 1 in order to reduce weight and limit the use of energy and thus reduce greenhouse gases. The packaging industry is also looking for lighter parts in order to reduce the cost of recycling as well as general use and transportation costs. There is thus a need to provide thermoplastic materials, in particular those based on polypropylene, which are modified with mineral fillers at a relatively low mass percentage, in order to maintain a lower density. However at the same time rigidity and impact resistance are to be maintained or improved compared to materials which are available. The plasturgic industry wishes also to retain the flexibility of being able to choose either masterbatches or ready-to-use compositions, as this improves its freedom in concept, ease of use and management of the production process. In some cases the plasturgic industry wishes merely to emulate the characteristics, especially physical characteristics of other materials which cause problems, such as those thermoplastic materials filled with glass fibre, as indicated above.

The process for introducing mineral fillers, whether pulverulent or in a concentrated version such as encapsulated in polyolefin waxes, to reinforce a composition is traditionally known to use a compounding extruder. Extrusion has the purpose to transform the thermoplastic polymers, mainly via transportation from the feeding point to the extrusion head, plasticising of the material via shear and/or heat and progressively increased pressure in order to ensure its passage through the die. Different types of extruders exist, including a single screw and twin screw extruder. Generally twin screw extrusion allows a better homogenisation because of the greater shearing compared to single screw extrusion, depending on the levels of mineral filler.

An extruder is often characterised by the ratio of the length and diameter of the screw (L/D), as well as the rotation direction of the screw, which for twin screw extruders can be co-rotating or counter-rotating, intermeshing or non-intermeshing and they may use forward conveying or reverse conveying elements. Preferred for the production of thermoplastic compositions are twin screw extruders which are intermeshing. It is possible to vary the geometry of the screw profile in order to adapt to the specific requirements and desired characteristics. Thus different numbers, order and geometries of the different elements making up the screw can be introduced, each element being characterised by its length, its conveyance, the number of threads, the direction of the helix etc. Other more complex elements can also be introduced, such as mixing discs and link pieces. These variations will be within the abilities of a person skilled in the art.

An extruder can be divided in the feeding zone, which is at the entrance of the extruder, the compression zone, where the mechanical work is carried out, and the pumping zone towards the end where the increased pressure will enable the shaping of the molten material through the die, and in the case of interest in this invention, the provision of a granulated masterbatch or a 'compound'. Heating elements can also be introduced and are particularly important for the heating of the matrix and the effective mixing and shearing of the ingredients. A person skilled in the art will understand that many types of compounding extruders exist and could be considered for use in the process according to the invention indicated below.

It is clear to the person skilled in the art that the introduction of large levels of mineral reinforcing fillers requires a good dispersion and homogenisation of the fillers in the thermoplastic matrix. In an ideal case, every unit of volume of matrix would have the same number of filler particles in it. The viscoelastic properties of the matrix will affect the ability to distribute the fillers well. Modification by increasing the fluidity, such as through the increase of temperature must be balanced with the danger of thermal deterioration of the polymer matrix. This can be compensated by the shear rate applied to the molten matrix mixture with filler. There is thus a significant risk of modifying the morphology of the mineral reinforcing fillers. This is well known especially for the reinforcement with fibres in thermoplastic matrices.

In French patent application 2842758 there is provided a process of obtaining nanocomposite materials made of a thermoplastic polymeric matrix and mineral nanofillers dispersed in the matrix, the nanofillers resulting from the exfoliation of formed agglomerates of lamellar mineral particles comprising (a) the use of a composition to be exfoliated comprising at least a thermoplastic polymeric compound to form the polymeric matrix, mineral particles in the form of lamellar stacks, beforehand treated by means of an organo-ionic agent to make the particles organophilic, (b) the formation of a viscoelastic mixture by kneading and heating the composition by making the polymeric compound viscous at a temperature at least equal to the working temperature of the most viscous polymeric compound present, and simultaneously kneading the polymeric compound with the treated lamellar mineral particles to be exfoliated, (c) the subjecting to thermo-mechanical work in a viscous state comprising compressing and significant shearing of the viscoelastic mixture, (e) the elimination of the volatile components generated during the thermo-mechanical work, (f) the transformation of the degassed viscoelastic mixture into a material industrially usable, characterised in that, to obtain a complete exfoliation of the treated lamellar mineral particles, and a controlled dispersion of the nanometric lamellar mineral particles resulting from exfoliation in the viscoelastic mixture, (d) the viscoelastic mixture resulting from the thermo-mechanical work of compression and kneading is subjected to a relaxation under soft mechanical kneading, at a weak rate of shearing, before being transformed into industrially usable material.

This patent application relates only to lamellar mineral particles which are no greater than 800 nanometers and which are selected from clays which are based on silicates of magnesium and aluminium, potentially with other cationic fillers present. No other fillers are being contemplated and the need for nanofillers (i.e. smaller than 1 μm) is indicated as essential to provide the searched after properties.

There is thus still a need to reduce the weight or density of parts made with olefinic polymeric materials because of economic reasons, environmental reasons, but this must be realised at the same time as maintaining a good level of rigidity and impact resistance. In addition there is a need to provide thermoplastic materials which do not use some of the more difficult to handle fillers, such as glass fibres, whilst maintaining a substantial equivalence to the properties of the thermoplastic materials using the glass fibres. Accordingly there is a need for a process using a compounding extruder which will allow the manufacture of master batches and ready-to-use compounds from a thermoplastic matrix, preferably a polyolefin, more preferably a polypropylene, charged with mineral reinforcing fillers, preferably lamellar fillers in order to provide, as ready-to-use compounds, either directly, or after dilution of a masterbatch, a relatively low level of filler, introducing a good rigidity without losing significant resistance to impact.

The applicants have now surprisingly found that by using certain lamellar mineral talc materials in conjunction with certain polypropylene matrices in particular process steps, benefits are obtained which are substantially greater than those provided with either the certain lamellar mineral materials in conventional processes or with traditional talc materials in special processes.

The invention accordingly provides in a first aspect a process of obtaining a thermoplastic composition formed from a polyolefin matrix comprising a polypropylene with a fluidity index of from 2 to 100 g/10 minutes when measured at 230° C. under 2.16 kg, and a mineral lamellar filler which is talc with a median diameter D50 of at least 1 μm, as measured by Sedigraph™, and a lamellarity index of at least 4 before introduction into the matrix and at least 3 when measured in the thermoplastic composition, by dispersing the lamellar talc in the polyolefin matrix in a viscoelastic state by means of at least one compounding extruder, which process comprises (a) the formation of a viscoelastic mixture of the polypropylene matrix and the mineral lamellar talc particles by heating and kneading the said composition at a temperature at least equal to the working temperature of the polypropylene, (b) the submission of the viscoelastic mixture to thermo-mechanical work, (c) the elimination of volatile components from the viscoelastic mixture, (d) the transformation of the viscoelastic mixture resulting from step (c) into an industrially usable granulated material, characterised in that, to obtain a controlled and homogenous dispersion and distribution of the lamellar mineral talc in the polypropylene matrix, while substantially retaining initial morphological characteristics of the lamellar mineral talc particles, the viscoelastic mixture is subjected during steps (a) and (b) to a weak and controlled rate of shearing of no more than 200 $s^{-1}$ and the viscoelastic mixture is subjected in step (b) to at least one cycle of extension and relaxation in a dedicated zone which is at least 25% of the total length of the at least one screw of the compounding extruder.

The process according to the invention provides compositions selected from specific types of polyolefins as matrix, charged with specific mineral lamellar fillers, which are worked through a particular process using a compounding extruder in order to obtain final compositions which bring together a reduction in density and a good rigidity and impact resistance in comparison with what can be obtained under the state of the art. Depending on the amount of the lamellar mineral filler used, the composition can be formed into a masterbatch, to be diluted before forming into a final product, or can be a ready-to-use composition.

The thermoplastic polyolefin matrix to be used in the process according to the invention is a polypropylene. This is to be used as the main ingredient when making the masterbatch and can also be used as the sole or main material for making the ready-to-use compositions. With the expression polypropylene, for use as the matrix, we mean homopolymers as well as copolymers, when obtained by any polymerisation process, using any catalyst, whether modified or not, alone or in mixture, formulated or not.

These polypropylenes are the result of polymerisation of propylene with itself, or where copolymers are concerned, with itself and other olefinic co-monomers, having a preferred chain-length of 2 to 12 carbon atoms, thus including for example ethylene, butylene, isopropylene, isobutylene, pentylene, hexylene, decylene and dodecylene, provided the propylene segment of the copolymer is present in an important quantity compared to the other co-monomers, preferably more than 50% by weight, more preferably at least 65%, most preferably at least 75% by weight based on the total weight of copolymer. Particularly useful polypropylene materials for use as the matrix include homopolymers of propylene, copolymers of propylene with ethylene, such as ethylene-alpha-olefin, including polypropylenes of high crystallinity.

The density of the preferred polypropylenes is in the range of 0.85 to 0.905 g/$cm^3$ when measured according to ASTM 1505. The polypropylenes must have a fluidity index of from 2 to 100 g/10 minutes when measured according to ASTM D1238, at 2.16 kg and 230° C. and preferably in the range of 5 to 55 g/10 minutes when used in the ready-to-use compositions or the masterbatches having up to 40% talc present by weight or 25 to 100 g/10 minutes when used in the masterbatches having from 30 to 70% talc present by weight.

Mixtures of polypropylenes can be used, such as different homopolymers, different copolymers or mixtures of homopolymers and copolymers of polypropylene. It is however also permitted to use mixtures of polypropylenes with other polyolefin homo- or copolymers which are compatible with, or have been made compatible with the polypropylenes, for example via grafting or through the use of agents acting as compatibilisers. In such mixtures, the polypropylenes must remain a majority component of the matrix, preferably being present at more than 70%, most preferably more than 80% of the matrix composition. Partial cross-linking of such mixtures may take place. These other polyolefins may also be used as the diluent for the making of ready-to-use compositions from the masterbatches.

The polyolefins of the matrix, or those used in the ready-to-use compositions may be virgin materials or may be materials used out of recycling activities, such as polypropylene materials which had already certain fillers present, including such fillers as calcium carbonates. Recycled materials may result from rejects during production, production stoppages or materials which are retrieved from recycled or scrapped products, such as automobiles, packaging etc.

The mineral lamellar fillers are reinforcing mineral fillers and are defined by different parameters, of which the average particle size is particularly important and sometimes also the distribution of the sizes and the morphology, and more specifically the shape of the particles constituting the pulverulent filler. The average particle size is measured as the median diameter of the particles present (D50). A value for D50 means that 50% by weight of the particles have a diameter which is equal to or smaller than the indicated value. A value of D95 can also be provided, which means that 95% by weight of the particles have a diameter which is no greater than the value provided as D95. A similar D98 value is also often provided. For non-spherical particles, the size indicates the equivalent spherical diameter of the particles. For the purpose of defining the particle size of the required lamellar mineral fillers, the Sedigraph apparatus is used and the particle size is determined through the sedimentation process, in accordance with AFNOR X11-683 standard. The values of D50, D95 and D98 may also be determined by laser measurement, based on the incident light diffraction by the particles. There is normally some difference between the D50 values from each of the measuring techniques.

The index of lamellarity, sometimes referred to as the coefficient of shape or shape factor, characterised the shape of the particles and more particularly the ratio between the largest dimension and the smallest dimension of the particles. For a lamellar filler the smallest dimension corresponds to the thickness of a single layer or lamella or of a series of layers connected to form what is known as a stack. This index of lamellarity is measured by the ratio of the difference between the D50 value of the particles as measured by laser (diffraction method) using a humid method (AFNOR NFX11-666 standard) and the D50 value measured by Sedigraph (sedimentation method) (AFNOR X11-683 standard) over the D50 value as measured by Sedigraph. More details about the determination of the index of lamellarity can be found in the article Estimation of the average aspect ratio of lamellae shaped particles by laser diffractometry by G Baudet, M. Bizi and J. P. Rona of the mineralogical department of the BRGM, as presented at the 23$^{rd}$ annual meeting of the Fine Particle Society in July 1992. The index of lamellarity is an indication of the ratio of the larger dimension of the particles over the smallest dimension. A high index of lamellarity is to be understood as having a value of around 4 or higher.

The specific surface area of the particles is another useful measure to determine the lamellar fillers for use in the process of the invention. The surface area is determined by the known process of argon absorption onto the surface of the particles in a monomolecular layer (method BET, AFNOR X 11 621 and 622 standard).

For the purposes of the process of this invention, the reinforcing mineral lamellar fillers which are to be used in the process are to be talc. They preferably have a combination of small particle size materials with a high index of lamellarity. The D50 value of the lamellar fillers for use in the process of this invention, as measured by Sedigraph, has a value of at least 1 μm, preferably from 1 to 2.5 μm. It is particularly preferred that the value for D98 as measured by Sedigraph is less than 20 μm, more preferably less than 15 μm. In parallel, the D50 measurement for the talc fillers to be used in the process of the invention, as measured by laser method is between 5 and 15 μm, more preferably between 8 and 12 μm. The lamellarity index for the talc fillers used in the invention is to be such that it is at least 4 prior to incorporation into the thermoplastic matrix.

Such talc fillers are obtained from macro-crystalline minerals with a pronounced lamellar character. Such minerals contain naturally some natural crystals, which appear as lamellae, in comparison to micro-crystalline talc which has natural crystals of a smaller size. Preferably one uses talc which comprises magnesium silicates, which are hydrated or chlorites, which is another phyllosilicate mineral, for example based on aluminium and magnesium hydrated silicates, such as chlinochlore, or a mixture of both, optionally mixed with other minerals having similar properties. The lamellar fillers may be surface treated in order to influence their physical behaviour, for example to reduce the tendency to agglomerate. Additional fillers may be added, such as for example mica, kaolin, in particular calcined kaolin, provided they have the appropriate shape and size characteristics as discussed for the talc particles. However it is necessary that talc constitutes at least 50% of the mineral filler content, and preferably at least 75%, most preferably talc is the only lamellar filler used.

The characteristics of the mineral lamellar fillers used must be such the lamellarity index is maintained at a level of at least 3 after incorporation into the thermoplastic composition by the process according to the invention. It was found that many of the other characteristics do not substantially change during the process, such as the D50 value as measured via Sedigraph and the surface area as measured by BET. In order to determine the index of lamellarity of the talc in the thermoplastic composition as made by the process according to the invention, the composition is calcined at a temperature of 425° C., i.e. a temperature just below the recrystallisation temperature of talc, for a period up about 2 hours. It is know that if the talc is ground, its BET surface area will increase and the average particle size will be reduced. However, it has been found by the inventors that limiting the reduction of the lamellarity index in the way indicated above is crucial to the provision of the benefits obtained by making thermoplastic compositions according to the invention, i.e. obtaining an acceptable resistance to impact whilst maintaining a good level of rigidity and in many cases also reducing the density in comparison to the state of the art or alternatively matching the characteristics of less desirable compositions, such as those containing glass fibre.

Other additives may be introduced in the process according to the invention in order to form part of the thermoplastic compositions this manufactured. Such additives include well known additives in thermoplastic compositions, such as thermoplastic elastomers, antioxidants, colorants, fluidity enhancers, viscosity modifiers, impact modifiers and the like. Preferably such other additives, especially those other than thermoplastic elastomers, do not constitute more than 10% by weight of the total thermoplastic composition, preferably not more than 5% by weight.

The process according to the invention is most preferably a continuous process comprising a number of steps. The process is carried out in a compounding extruder with at least one screw, preferably with a twin screw arrangement. There is a feeding zone, provided with heating ability, a general mechanical working zone, a degassing zone, a filtration zone and a granulation zone.

The first step of the process according to the invention is the formation of a viscoelastic mixture of the polypropylene matrix and the lamellar mineral talc particles by heating and kneading the said composition at a temperature at least equal to the working temperature of the polypropylene. The components for the thermoplastic compositions are introduced in a relevant zone, often through one or more apertures, each situated for example under or at the end of a hopper. They may be introduced as a dry mixture of previously prepared pulverulent ingredients in the appropriate proportions. Alternatively each component may be introduced separately in the appropriate amounts, for example though dosing equipment. The order of introduction is not critical, provided the relevant proportions are ensured in the compounding extruder. After its introduction, the polymer matrix is heated to reach at least a sufficiently thermo-viscous liquid state to enable it to receive or be thoroughly mixed with the lamellar mineral particles. Other ingredients may be introduced at the starting point of the extruder or at any other appropriate part, for example as part of the starting dry mix introduced in the compounding extruder, as one or more separate mixtures or as separately introduced ingredients through separate dosing devices. It is preferred that liquid materials will be introduced either as mixtures with pulverulent materials onto which they may be adsorbed, by which they may be absorbed or with which they may be mechanically mixed, although it may be possible to introduce them separately through adapted orifices and/or dosing devices. It will be obvious to the person skilled in the art how the introduction of the different components can be arranged.

Preferably the polypropylene, optionally with additional polyolefins, which forms the matrix will be introduced as a powder or as granules through dosing equipment at the starting end of the compounding extruder. The mineral lamellar reinforcing fillers are introduced in powder form, preferably through a second dosing equipment at the starting end of the compounding extruder, although adding it in dry pre-mixture with the polypropylene is equally acceptable. It is also possible to provide the compounding extruder with the possibility of introducing the mineral fillers through a side entrance provided with a screw feeder as the dosing device. The apertures for introduction of the components will be in the most convenient location of the extruder, preferably such that the thermoplastic matrix polymers, whether already mixed or not with the mineral lamellar reinforcing filler, are first brought to a molten state so that the other components can be easily mixed in with them.

In this first step of the process, taking place mainly in the feeding zone of the compounding extruder, the temperature is increased. This is done at a speed selected to provide a reasonably quick change of the polymers in the matrix to a viscoelastic state till they reach at least the working temperature of the most viscous component of the polymers which will form part of the matrix. This temperature is normally set in the range between the melting temperature of the polymer component for the matrix which has the highest melting point and/or the glass transition temperature of the most amorphous polymer component on the one hand and the temperature at which polymeric components of the matrix degrade. The thermal energy is provided partially by heating and regulating the relevant zone of the compounding extruder and by the mechanical effect of shearing which results from the kneading of the composition in its transition from solid to liquid. It is therefore important to control the speed of heating in order to avoid the degradation of the polymer components of the matrix.

The second step of the process according to the invention is the submission of the viscoelastic mixture obtained in step (a) to thermo-mechanical work. This thermo-mechanical work includes the extension/stretching and relaxation and a weak shearing of the mixture formed in step (a). This viscoelastic mixture is preferably maintained at a temperature close to that reached at the end of the preceding step. The thermo-mechanical work is intended to provide the complete and homogenous dispersion of the mineral lamellar filler particles in the viscoelastic matrix, without substantially changing their initial shape and form. The zone in which this step is performed is at least 25% of the total length of the at least one screw of the compounding extruder, more preferably 30%, most preferably 40%. The time during which the viscoelastic mixture is exposed to step (b) will depend to some extent on the polymer components, the temperature of the viscoelastic mixture and thus its viscosity, and thus of the shear which is required.

The shearing particularly results from subjecting the viscoelastic mixture to unidirectional forces of stretching/extension applied during relatively long periods in comparison with the periods of relaxation of the longest polymeric chains and certainly longer than the periods normally applied in the state of the art. The application and relaxation of the unidirectional forces provide a relatively weak and mild elongational shear rate, and is preferably applied repeatedly in cyclical form. This stage of the process with the cyclical application of applying the stretching/extension forces and the relaxation is provided in a zone where the geometry of the screw or screws is such that the relevant threads of the screw or screws of the compounding extruder are filled to at least 80% by volume, preferably at least to 90%, most preferably at 100% of their capacity. It is of course possible, and even desirable that such filling percentages are achieved throughout the whole process according to the invention.

The shear rate applied to the viscoelastic mixture in the zone of step (b) is at most 200 $s^{-1}$ and preferably no more than 150 $s^{-1}$, most preferably no more than 100 $s^{-1}$. The way this shear rate is determined for the purposes of the process of this invention is by using a simulating software called 'Ludovic' which was developed by the CEMEF of the School of Mines of Paris at Sophia Antipolis in France, which describes in rheological terms twin screw extrusion systems as a function of their screw profiles and which was validated with commercial extrusion systems and conditions. The value of shear rate applied during this step (b) is such that the mineral lamellar fillers present in the matrix which is rendered viscoelastic, do not have to suffer excess mechanical stress or force caused by excessive shearing of the viscoelastic mixture, and thus avoid the breakdown of the lamellar mineral fillers which are embedded/distributed in the polymer matrix in its molten stage. Such breakdown would result in a reduction or loss, at least partial, of their reinforcing capacity, and thus in a reduction of the rigidity of the thermoplastic composition when made in to a solid part.

As a result of controlling the shear rate as indicated above, the mineral lamellar fillers present will be able to maintain an index of lamellarity, when incorporated in the thermoplastic compositions through the process according to the invention, which does not descend below 3, when measured as indicated earlier, when a filler is selected with a lamellarity index of at least 4 prior to incorporation in the thermoplastic composition made by the process according to the invention. It is believed that the reduction in the index of lamellarity which is seen in the process is partly due to a degradation of the geometry of the mineral fillers, which needs to be kept to a minimum. A process according to the invention is particularly able to achieve this minimal loss. It is important to maintain such index of lamellarity in the compositions made by the process if one wishes to see the benefits described herein.

In this step (b) the viscoelastic mixture is subjected to alternate extensions/stretching on the one hand and relaxations during a period which is a lot longer than the period traditionally used in conventional processes for formation of thermoplastic compositions on the other. Typically the time used is 2 to 4 times greater than used in traditional single screw of twin-screw compounding extrusions. Different configurations of the screw profiles may be considered by modifying the successive interchangeable section elements of the screw(s). The ability of the chosen profile to disperse and distribute the mineral lamellar reinforcing fillers in the thermoplastic matrix without fracturing the lamellar fillers to any significant extent, combined with the management of the interfacial interactions and the control of the nucleating effect of the talc will be defined by the profile used and the associated extrusion conditions, including the rotation speed of the screw and the temperature of the molten mass.

Preferably one would select a combination of elements of the screw profile and their transportation characteristics such that relatively long residence times are achieved, preferably by elongational kneading whilst respecting the shearing rate, minimising the breakdown of the mineral lamellar filler particles and ensuring good dispersion and distribution without which the desired mechanical properties cannot be met.

In step (c) of the process according to the invention, all volatile materials which have formed or accumulated during the previous steps of the process have to be substantially eliminated from the viscoelastic mixture, such as those resulting from the heating of the mixture and the entrapment of air. This is achieved in one or more zones in which relaxation of the viscoelastic mixture is enabled during which a reduction in pressure, such as by vacuum is applied, enabling the degassing of the mixture.

In step (d) the viscoelastic mixture, from which the volatile components have been totally or substantially removed is subjected to rheological conditions such that the viscoelastic mixture is placed in thermal conditions which allow the extrusion through a die, in particular a granulation die or granulation head in order to provide granules which are destined for use in the production of parts by known plasturgic methods. Such thermoplastic compositions obtained by a process according to the invention may be in the form of so-called masterbatches, which are intended to be diluted with thermoplastic polymers, in this case, preferably mainly or totally based on polypropylene, which can be homopolymers, copolymers or mixtures thereof, or on other compatible polyolefin materials, and thus are, upon such dilution, formed into end-use thermoplastic compositions which are ready for making into thermoplastic parts. Alternatively, the thermoplastic compositions provided through the process of the present invention, may be already in the form of ready-to-use compositions, which do not need any further dilution before being made into thermoplastic parts by well know plasturgic methods and processes. It is preferred that the masterbatches will comprise a higher weight ratio of mineral lamellar filler, such as 30 to 70% by weight based on the total weight of the fillers and the thermoplastic matrix combined, preferably on the total weight of the thermoplastic composition, more preferably 30 to 60%, most preferably 40 to 60%. Ready-to-use thermoplastic compositions preferably have a lower level of mineral lamellar fillers, such as 0.5 to 40% by weight, more preferably 2 to 35% by weight, most preferably 5 to 25% by weight based on the combined weight of the polymer matrix and the mineral lamellar fillers, preferably based on the total thermoplastic composition. The preferred ratio of mineral lamellar filler will however be mainly determined by the desired characteristics of the final part to be made from the thermoplastic composition.

The thermoplastic compositions obtained by the process according to the invention may be transformed by plasturgic techniques and processes such as injection moulding, extrusion and calendaring, and will result in parts which may have a lower weight, mainly through a lower density than parts which today are needed with a similar rigidity and resistance to impact, because the process according to the invention can provide such characteristics with lower levels of the reinforcing lamellar mineral fillers than the prior art was able to do. Such parts are particularly useful in the automotive industry, domestic appliance industry, electronic industry, building industry, construction industry, internal design industry, sport and leisure industry, in packaging and in toys. Examples in the automotive industry include dashboard, door panel and bumper to name but a few.

Another useful application is the replacement of thermoplastic parts which are made from compositions using less desirable fillers, in particular glass fibre. Here, reduction in density or weight is not normally the main purpose or benefit, as the density would be very similar for similar loadings, but other benefits are achieved without loss of useful characteristics, particularly those of impact strength and rigidity. Such benefits arise for example from the fact that there would be less wear on the tools used in the making of the thermoplastic compositions or the thermoplastic parts, as glass fibre tends to be harsher on the tools, less environmental impact during the manufacture of the thermoplastic composition, better dimension stability, greater flexibility in finishes, including colour options, avoidance of the need to paint or finish the surfaces otherwise and improved ease of recycling.

There now follow a number of examples and comparative examples which are not intended to limit the scope of the invention, but to illustrate the invention. All parts and percentages are provided by weight, unless otherwise indicated.

EXAMPLE 1

A master batch thermoplastic composition was prepared, intended to be diluted with a polyethylene polypropylene copolymer for use in the manufacture of an automobile parts. It was prepared from a mineral talc filler from the supplier Talc de Luzenac S.A. and sold as Talc HAR W92™, with a Sedigraph D50 value of 2 μm and a D50 value measured by laser of 11 μm. The BET specific surface was 20 $m^2/g$ and the index of lamellarity was 4.6. The polymer matrix was made from homopolymeric polypropylene with a fluidity index of 12 g/10 minutes at 230° C. and 2.16 kg, sold as PPH7060 by Total Petrochemicals. The HAR W92 was added as 30% by weight of the composition, with the PPH7060 making up the remainder of the composition.

The components were mixed in a compounding extruder fitted with a co-rotating twin-screw with a shearing rate of less than 100 $s^{-1}$ and a temperature below 240° C. The compounding extruder was a type MARIS® co-rotating twin-screw with a 40 mm screw diameter and a L/D ratio of 48. It contained elements allowing the kneading and the conveying of the mixture. Step (a) of the process was conducted in zones 1 and 2, step (b) in zones 3 to 10, step (c) started from zone 3 onwards and step (d) was done in zones 11 and 12 of the screw profile. The temperature settings for zones 1 to 12 were respectively 80, 170, 190, 210, 220, 220, 220, 220, 220, 220, 220 and 200° C. The temperature of the die for the formation of the granules was set at 280° C., using standard equipment where the molten mass was introduced to a submerged cutter to form the granules.

After the process, which is according to the invention, was completed, the characteristics of the HAR W92 fillers were measured and Table 1 provides the values alongside the values of the fillers prior to their incorporation in the thermoplastic composition, which indicates that the morphological characteristics of the talc remained substantially unaltered, except that the lamellarity index had a small decrease.

TABLE 1

| | Sedigraph D50 | Laser D50 | Lamellarity index | BET |
|---|---|---|---|---|
| HAR W92 before | 1.9 μm | 10.6 μm | 4.6 | 20.5 $m^2/g$ |
| HAR W92 after | 1.9 μm | 9.1 μm | 3.8 | 19.9 $m^2/g$ |

The thermoplastic composition thus obtained had a density of 1.12 $g/cm^3$ and a fluidity index of 11 g/10 minutes (230° C., 2.16 kg). This master batch was further diluted with a heterophase polypropylene copolymer with a high level of ethylene, a fluidity index of 15 g/10 minutes (230° C., 2.16 kg) a flexural modulus (3 point) at 23° C. of 950 mPa, a notched Izod impact resistance value (ASTM D 256 and ISO 180) of 8 $kJ/m^2$ at −20° C. and a flow resistance of 24 MPa (i.e. strength at yield point according to ISO 527). This polypropylene was supplied by Total Petrochemicals as PPC7810. The test samples were prepared according to ISO norms using a standard injection press DEMAG 80T. Table 2 provides the details of the dilutions applied.

The samples were then tested, and the results are provided in Table 3, where density is measured at 23° C. according to ISO1183 and is provided in $g/cm^3$; flexural modulus (FM) is measured according to ISO178 at 23° C. and is provided in MPa; notched Izod Impact (Izod) is measured according to ISO179 at −30° C. and provided in $kJ/m^2$; notched Charpy impact (Charpy) is measured according to ISO179 at −30° C. and provided in $kJ/m^2$; tensile strength at yield point (TSy) is measured according to ISO527 at 23° C. and provided in MPa; distortion temperature (DT) under 1.8 MPa is provided in ° C.; flow direction shrinkage (Shrink) is provided in % and measured at 23° C. For comparison reason, the requirements of the automobile industry for different automobile parts are also given in Table 4. In the automotive industry a compromise is needed between the thermo-mechanical properties, such as impact resistance at low temperature, the dynamic properties, such as rigidity, tensile properties, such as the mechanical resistance at high temperatures, often measured as distortion under pressure. Requirements of dimensional stability and ease of use are of course also essential.

TABLE 2

| | Example composition | | | | | |
|---|---|---|---|---|---|---|
| | 1 | 1a | 1b | 1c | 1d | 1e |
| Dilution (% master batch used) | 100 | 10 | 2 | 30 | 40 | 60 |
| % talc present | 30 | 3 | 6 | 9 | 12 | 18 |

TABLE 3

| | Example composition | | | | |
|---|---|---|---|---|---|
| | 1a | 1b | 1c | 1d | 1e |
| Density | 0.918 | 0.936 | 0.960 | 0.975 | 1.01 |
| FM | 1210 | 1471 | 1720 | 1845 | 2520 |
| Izod | 5.4 | 4.8 | 4.4 | 4.2 | 3.17 |
| Charpy | 5.7 | 5.5 | 5.3 | 4.7 | 3.5 |
| TSy | 24.6 | 25.4 | 28 | 28 | 32.1 |
| DT | 53.8 | 57.5 | 60 | 61.3 | 68.4 |
| Shrink | 1.16 | 1.12 | 1.1 | 1.05 | 1.06 |

TABLE 4

| Requirement | Dash board | Door panel | Bumper |
|---|---|---|---|
| Density | N/A | N/A | N/A |
| FM | 1850 | 1000 | 1500 |
| Izod | N/A | N/A | 5.5 |
| Charpy | 4.8 | 10 | N/A |
| TSy | 20 | 20 | 25 |
| DT | >55 | >50 | 55 |
| Shrink | 1.1 | 1.2 | 1 |

Alternative propylene materials were tested with the same composition, which has a fluidity index of from 10 to 15 g/10 minutes at 230° C. and 2.16 kg, and provided very similar results to those of Example 1 compositions. These included 100 G A12 from Ineos Polyolefins, 520 P from SABIC and 1364 E1 from Exxon Mobil Chemicals.

The balance between the rigidity and the resistance to impact is in general the first criterion which is used in the selection of thermoplastic compositions for the automotive industry. This balance can be expressed in graphic form by plotting the flexural modulus (3 points) against the notched Izod impact resistance at −30° C. for different thermoplastic compositions. From the values in Tables 3 and 4, it can be seen for example that for a dashboard the requirement are met with a compositions resulting from a 30% masterbatch (at 30% by weight of talc filler) in diluent polymer, resulting in a 9% talc containing thermoplastic composition. For a bumper only 6% talc is required in the final composition, and for a door panel, one can use a 3% talc content or even less, which could be read from the relevant graphic representation. Good results in notched Izod impact resistance can surprisingly be obtained by the compositions according to the invention, even without the introduction of an elastomeric compound, which is beneficial also in view of the need to improve recycling ability of parts. The benefit of the lower density resulting from the lower amounts of talc in the compositions is self evident, especially in view of energy consumption in the automotive industry. The high mechanical properties may enable the formation of thinner parts, which may in themselves enhance the weight savings. The shrinkage results are particularly remarkable in view of the fact that for semi-crystalline polymer such as polypropylene such values are normally not very beneficial.

EXAMPLE 2

A masterbatch thermoplastic composition was prepared as described in Example 1, which was then diluted to provide a level of 4% by weight of the mineral talc HAR W92 with the polypropylene polymer 7810 of Total Petrochemicals, described in Example 1. Example C2 was used as a comparison, which is a masterbatch 33MBTU from the supplier Sabic, believed to be based on a similar polypropylene having a fluidity index of 10 g/10 minutes (230° C., 2.16 kg), but with a standard talc, having a lamellarity index believed to be far inferior to 3, applied as 33% by weight based on the total composition comprising only the polypropylene matrix and the talc. This comparative masterbatch was diluted with a polypropylene copolymer 108MF10 from Sabic, believed to be very similar in nature to polymer 7810 from Total Petrochemicals to result in a ready-to-use having a filler ratio of 10% by weight. Both Example 2 and Example C2 compositions were made into test pieces which were subsequently tested. Some tests were as identified in Example 1, and the same nomenclature and units are used, and in addition Tensile Strength at break (TSb) was measured in accordance with ISO527 at 23° C. and provided in MPa; Elongation at break (Elb) was measured using ISO527 at 23° C. and is provided in percentage based on original dimension. The results are provided in Table 5, showing that with a much lower level of talc present equivalent results with regard to rigidity and flexural modulus can be obtained and with some further improvements too.

TABLE 5

| | Example composition | |
|---|---|---|
| | 2 | C2 |
| Density | 0.925 | 0.960 |
| FM | 1300 | 1300 |
| Izod | 6-7 | 7 |
| TSb | >20 | 16 |
| TSy | 25 | 18 |
| Elb | 300 | 200 |
| Shrink | 1.15 | 1.15 |

EXAMPLE 3

A thermoplastic masterbatch composition was prepared in accordance with Example 1, and was then diluted with a polypropylene homopolymer having a fluidity index of 12 g/10 minutes (230° C./2.16 kg) and sold as 100GA12, commercialised by Ineos Polyolefins to give Example compositions 3a to 3e. Example 3f was as made in Example 1, and left undiluted. Examples 3g and 3h were prepared using the process of Example 1, but using a higher proportion of the talc filler (to achieve 40 and 50% by weight of the talc filler respectively) and using a polypropylene having a fluidity index of 40 instead of 12. Comparative Examples (C3a to C3l) were prepared as ready-to-use thermoplastic compositions using a range of state of the art fillers, including Calcium Carbonate ($CaCO_3$), standard talc (Talc), having a lamellarity index believed to be far below 3 and glass fibre (GF) by state of the art compounding/extrusion techniques, such as those described in French patent application FR 2761692. The levels of incorporation, expressed in percentage by weight of the total compositions are described in Table 6. Test results are selected from and performed as described in the previous examples, except that the Charpy test was unnotched, and that in addition the measure of elongation at yield (Ely) was performed according to ISO527 at 23° C. and expressed in percentage based on the original dimension as well as the flexural modulus at 90° C. (FM90). The results are given in Table 7.

TABLE 6

| | % filler by weight | | | | | | | | |
|---|---|---|---|---|---|---|---|---|---|
| | 0 | 3 | 5 | 7 | 10 | 20 | 30 | 40 | 50 |
| HAR W92 | C3a | 3a | 3b | 3c | 3d | 3e | 3f | 3g | 3h |
| Talc | | | | | C3b | C3d | C3f | C3i | C3k |
| $CaCO_3$ | | | | | C3c | C3e | C3g | C3j | C3l |
| GF | | | | | | | C3h | | |

TABLE 7

| Example composition | Density | Charpy | FM | FM90 | Ely | TSy | Shrink | DT |
|---|---|---|---|---|---|---|---|---|
| C3a | 0.95 | 110 | 1200 | 250 | 6 | 35 | 1.8 | 51 |
| 3a | 0.91 | 85 | 1835 | 540 | 3.8 | 38 | 1.26 | 50 |
| 3b | 0.93 | 84 | 2010 | 590 | 3.8 | 39 | 1.25 | 62 |
| 3c | 0.96 | 72 | 2300 | 650 | 3.8 | 39.5 | 1.21 | 64 |
| 3d | 0.99 | 65 | 2600 | 760 | 1.8 | 40 | 1.15 | N/A |
| C3b | 0.99 | 55 | 1800 | 380 | 3.3 | 34 | 1.3 | N/A |
| C3c | 0.99 | 79 | 1350 | N/A | 5.5 | 29 | 1.6 | N/A |
| 3e | 1.05 | 44 | 3760 | 1120 | 1.1 | 41 | 1 | N/A |
| C3d | 1.05 | 45 | 2300 | 500 | 3 | 34 | 1.22 | 65 |
| C3e | 1.05 | 70 | 1500 | N/A | 5 | 27 | 1.5 | 55 |
| 3f | 1.12 | 30 | 4840 | 1550 | 1.1 | 41.5 | 0.9 | N/A |
| C3f | 1.12 | 33 | 3300 | 950 | 2.5 | 33 | 1.1 | 75 |
| C3g | 1.12 | 55 | 1950 | N/A | 4 | 26 | 1.2 | 56 |
| C3h | 1.14 | N/A | 5100 | 1690 | 1 | 80/40* | 0.6 | 140 |
| 3g | 1.23 | 18.6 | 5825 | N/A | 1.8 | 40.6 | 0.68 | 100 |
| C3i | 1.23 | 25 | 4500 | 1450 | 1.8 | 34 | 0.8 | 82 |
| C3j | 1.23 | 43 | 2400 | N/A | 2.5 | 24 | 1 | 65 |
| 3h | 1.32 | 14 | 6800 | N/A | 1.3 | 40 | 0.53 | 105 |
| C3k | 1.32 | 17 | 5100 | N/A | 1.5 | 31 | 0.7 | 85 |
| C3l | 1.32 | 18 | 3200 | N/A | 2 | 21 | 0.9 | 70 |

*the second value provided here indicates the strength at yield cross direction.

EXAMPLE 4

Thermoplastic compositions were made as masterbatches according to the process of the invention as described in Example 1. They were diluted to ready-to-use compositions with respectively 3, 5, 7, 10, 20 and 30% talc HAR W92 filler respectively for Examples 4a, 4b, 4c, 4d, 4e and 4f, using the same polypropylene polymer as used in the master batch. Example 4f is of course undiluted master batch. Additional thermoplastic compositions were made as masterbatches according to the process of the invention as described in Example 2. These were diluted to provide ready-to-use compositions having respectively 3, 6, 9, 12 and 18% talc HAR W92 filler for Examples 4g, 4h, 4i, 4j and 4k, using the same polypropylene as used in the masterbatch. As comparative example (C4) was used a thermoplastic composition as described in French patent application FR2761692 Example 2, formulation A, which has 25% by weight of the special talc with high lamellarity index in a similar polypropylene copolymer which has a lower level of ethylene and is known to be provide greater rigidity than the polymers used in our illustrative Example 4 compositions. The test results for some of these products are given for different tests as described before or detailed below in Table 8, where the Charpy test was unnotched and carried out at −23° C.

TABLE 8

| | Example composition | | | | | |
|---|---|---|---|---|---|---|
| | 4g | 4h | 4i | 4j | 4k | C4 |
| % talc | 3 | 6 | 9 | 12 | 18 | 25 |
| FM | 1210 | 1470 | 1720 | 1845 | 2520 | 2560 |
| Charpy | 130 | 77 | 64 | 60 | 60 | 42 |

The results show that the compositions according to the process of the invention provide a flexural modulus which is equivalent to the ones provided by the prior art (C4) best available results, but with a talc which has a lower lamellarity index (which is 10 for C4) and at a surprising 7% lower loading of the filler. This permits the lowering of the density (1.01 for 4k and 1.09 for C4) in order to improve the environmental benefit of the invention. The unnotched Charpy impact resistance is also 50% better for the compositions made according to the invention compared with the prior art for the loading of talc filler which provides the same flexural modulus (see 4k vs C4).

EXAMPLE 5

Thermoplastic compositions were prepared with the following compositions (amounts given in parts by weight), as described in Table 9. The compositions for Examples 5a, 5b, 5c, 5d and 5e used the process according to the invention, whereas comparative examples C5a, C5b, C5c, C5d and C5e were prepared with a standard prior art process, as was used for example in French patent application FR2761692. Test pieces were then prepared and tested as indicated before. Results are provided in Table 10 below.

TABLE 9

| | Example composition | | | | |
|---|---|---|---|---|---|
| | 5a/C5a | 5b/C5b | 5c/C5c | 5d/C5d | 5e/C5e |
| Polypropylene PPh100GA12 | 97 | 95 | 93 | 90 | 80 |
| Talc HAR W92 | 3 | 5 | 7 | 10 | 20 |
| Antioxidant Irganox 1010 | 0.1 | 0.1 | 0.1 | 0.1 | 0.1 |

TABLE 10

| | Example composition | | | | | | | | | |
|---|---|---|---|---|---|---|---|---|---|---|
| | 5a | C5a | 5b | C5b | 5c | C5c | 5d | C5d | 5e | C5e |
| % talc | 3 | 3 | 5 | 5 | 7 | 7 | 10 | 10 | 20 | 20 |
| FM | 1800 | 1662 | 2050 | 1799 | 2250 | 2096 | 2600 | 2305 | 3650 | 3408 |
| Charpy | 85 | 86 | 85 | 84.4 | 73 | 75 | 64 | 63.9 | 45 | 44.4 |
| TSy | 38.3 | 38.8 | 39.1 | 39.2 | 39.5 | 39.5 | 40.2 | 39.6 | 41 | 39.8 |

These results indicate that the flexural modulus shows an average improvement of 12% by using the process according to the invention, without any loss of Charpy impact resistance. The unusual evolution of the tensile strength at yield, which increases with the amount of talc present (with other fillers, this normally decreases), is similar for the two processes up to an amount of about 7% by weight of the filler. Above 7% the improvement is greater for the process according to the invention than for the prior art process. In conclusion, it is clear that the impact resistance is greater for the process according to the invention for a given rigidity, or stated alternatively, that for a given impact resistance, the rigidity is improved when the thermoplastic composition is made according the process of the invention.

EXAMPLE 6

Thermoplastic compositions were made with the compositions provided in Table 11 provided in parts by weight, using either HAR W92 talc or a standard talc, PR8218 with a lamellarity index believed to be substantially below 3, supplied by Luzenac Talc. The polypropylene polymers used were PPH 7060, as was used in Example 1, from Total Petrochemicals, and PPH10012 from the same company, which is a homopolymer of polypropylene having a fluidity index at 230° C. and 2.16 kg of 40 g/10 minutes.

TABLE 11

| | Example compositions | | | |
|---|---|---|---|---|
| | C6a | C6b | C6c | 6a |
| PPH7060 | 43.7 | 43.7 | 69.2 | 69.2 |
| PPH10012 | 27 | 27 | — | — |
| HAR W92 | — | — | 30.5 | 30.5 |
| PR8218 | 29 | 29 | — | — |
| Irganox 1010 | 0.3 | 0.3 | 0.3 | 0.3 |
| Process used | Prior art | Invention | Prior art | Invention |

In addition Example 6b was prepared by diluting 6a with additional PPH7060 to provide a 15% by weight comprising talc in a ready-to-use thermoplastic composition according to the invention. The samples were prepared for testing of the flexural modulus at 23, 40 and 90° C. Unnotched Charpy impact resistance was also tested at 23, 0 and −23° C. and the results are provided in Table 12.

TABLE 12

| | Example composition | | | | |
|---|---|---|---|---|---|
| | C6a | C6b | C6c | 6a | 6b |
| FM 23° C. | 2970 | 3400 | 4350 | 4990 | 3050 |
| FM 40° | 2020 | 2196 | N/A | N/A | N/A |
| FM 90° C. | 830 | 900 | 1350 | 1550 | 915 |
| Charpy −23° C. | 13.8 | 14 | 13 | 13 | N/A |
| Charpy 0° C. | 17 | 16 | 17 | 13 | N/A |
| Charpy 23° C. | 31 | 29 | 31 | 28 | 56 |

The results indicate that in each case the rigidity can be increased by the using the process according to the invention, even for standard talc fillers, but the values obtained with the talc as required by the process of the invention provide significantly improved results over those using the standard talc. It also indicates that similar flexural modulus values can be obtained with half the talc content, if the compositions are made according to the invention compared to those using the same process, but a different talc. It becomes clear that the compositions obtained by the process according to the invention provides an improvement of about 12% in the rigidity, whilst only suffering a minor (at most 3%) reduction in the impact resistance. Changing the standard talc for talc as required by the process according to the invention provides a surprising 40% improvement in rigidity with equal impact resistance. Surprisingly, by halving the amount of talc present in the compositions made by the process of the invention, a substantial improvement of the impact resistance is obtained.

The invention claimed is:

1. A process of obtaining a thermoplastic composition formed from a polyolefin matrix comprising a polypropylene with a fluidity index of from 2 to 100 g/10 minutes when measured at 230° C. under 2.16 kg, and a mineral lamellar filler which comprises talc with a median diameter D50 of at least 1 μm as measured by Sedigraph, and with a lamellarity index of at least 4 before introduction into the matrix and at least 3 when measured in the thermoplastic composition, by dispersing the mineral lamellar talc in the matrix in a viscoelastic state by means of at least one compounding extruder, which process comprises (a) the formation of a viscoelastic mixture of the matrix and the mineral lamellar talc by heating and kneading the thermoplastic composition at a temperature at least equal to the working temperature of the polypropylene, (b) the submission of the viscoelastic mixture to thermo-mechanical work, (c) the elimination of volatile components from the viscoelastic mixture, (d) the transformation of the viscoelastic mixture resulting from step (c) into a granulated material, characterised in that, to obtain a controlled and homogenous dispersion and distribution of the mineral lamellar talc in the matrix, while substantially retaining initial morphological characteristics of the mineral lamellar talc, the viscoelastic mixture is subjected during steps (a) and (b) to a rate of shearing of no more than 200 $s^{-1}$ and the viscoelastic mixture is subjected in step (b) to at least one cycle of extension and relaxation in a dedicated zone which is at least 25% of the total length of the at least one screw of the compounding extruder.

2. A process according to claim 1, wherein the median diameter D50 of the mineral lamellar talc is from 1 to 2.5 μm when measured by Sedigraph.

3. A process according to claim 1, wherein the matrix is selected from homopolymers, copolymers of polypropylene, or mixtures thereof.

4. A process according to claim 1, wherein the matrix has a fluidity index of from 5 to 55 g/10 minutes when measured at 230° C. under 2.16 kg.

5. A process according to claim 1, wherein the matrix has a fluidity index of from 55 to 100 g/10 minutes when measured at 230° C. under 2.16 kg.

6. A process according to claim 1, wherein the mineral lamellar talc is a hydrated magnesium silicate or a hydrated aluminium and magnesium silicate.

7. A process according to claim 1, wherein the mineral lamellar talc is present in the matrix in a weight percentage of from 0.5 to 70% based on the combined weight of the polypropylene and the mineral lamellar talc in the matrix.

8. A process according to claim 1, wherein the polypropylene in the matrix and the mineral lamellar talc are mixed together in dry form prior to being fed into the compounding extruder.

9. A process according to claim 1, wherein step (a) is carried out at a working temperature selected to be a working temperature for the most viscous polyolefin component in the matrix, which is between a fusion temperature of the polyolefin component with the lowest fusion temperature and/or a glass transition temperature of the most amorphous polyolefin component.

10. A process according to claim 1, wherein during step (b) threads of the at least one screw of the compounding extruder are filled to 100% of their volume capacity during step (b) of the process.

11. A process according to claim 1, wherein the thermoplastic composition is provided in the form of a masterbatch, ready for further compounding with other thermoplastic components based primarily on polypropylene homo or copolymers.

12. A process according to claim 1, wherein the thermoplastic composition is provided as a ready-to-use compound for manufacture of thermoplastic end products by any plasturgic process.

13. A thermoplastic composition obtained by the process of claim 1.

14. A process according to claim 6, wherein the mineral lamellar filler further comprises at least one other mineral filler selected from micas and calcined kaolins.

15. A process according to claim 3, wherein the homopolymers, the copolymers of polypropylene, or the mixtures thereof are mixed with a smaller amount of other types of polyolefin which are or have been made compatible with the polypropylene.

16. A process according to claim 1, wherein step (a) is carried out at a working temperature selected to be the degradation temperature of the polyolefin components.

* * * * *